(12) United States Patent
Klemm et al.

(10) Patent No.: US 11,036,038 B2
(45) Date of Patent: Jun. 15, 2021

(54) CLOSED-LOOP CONTROL OF A SCANNER WITH FREQUENCY-SPACE ANALYSIS OF A SYSTEM DEVIATION

(71) Applicant: Carl Zeiss Microscopy GmbH, Jena (DE)

(72) Inventors: Frank Klemm, Jena (DE); Joerg Engel, Weida (DE); Carsten Wehe, Weimar (DE)

(73) Assignee: Carl Zeiss Microscopy GmbH, Jena (DE)

( * ) Notice: Subject to any disclaimer, the term of this patent is extended or adjusted under 35 U.S.C. 154(b) by 258 days.

(21) Appl. No.: 16/385,884

(22) Filed: Apr. 16, 2019

(65) Prior Publication Data

US 2019/0317307 A1 Oct. 17, 2019

(30) Foreign Application Priority Data

Apr. 17, 2018 (DE) .......................... 102018109055.2

(51) Int. Cl.
*G02B 21/00* (2006.01)
*G05B 13/00* (2006.01)

(52) U.S. Cl.
CPC ..... *G02B 21/0084* (2013.01); *G02B 21/0048* (2013.01); *G05B 13/00* (2013.01)

(58) Field of Classification Search
CPC ............ G02B 21/0084; G02B 21/0048; G02B 7/182; G02B 7/1821; G02B 21/0004; G02B 21/002; G02B 21/0036; G05B 13/00; G05B 13/02; G05B 13/04; G05B 13/041; G05B 13/042; G05B 13/0205; G05B 13/021; G05B 13/024; G05B 21/00; G05B 21/02

USPC ............ 359/368, 196.1, 197.1, 198.1, 199.1, 359/201.1, 201.2, 202.1, 212.1, 213.1, 359/214.1, 221.2, 362, 363, 369; 700/28, 700/29, 30, 32, 33

See application file for complete search history.

(56) References Cited

U.S. PATENT DOCUMENTS

| | | | |
|---|---|---|---|
| 2003/0090771 A1* | 5/2003 | Sakai | G02B 26/105 |
| | | | 359/199.3 |
| 2004/0212862 A1 | 10/2004 | Toyama et al. | |
| 2005/0174124 A1* | 8/2005 | Huang | G02B 26/0816 |
| | | | 324/520 |

(Continued)

FOREIGN PATENT DOCUMENTS

| | | |
|---|---|---|
| DE | 19702752 | 7/1998 |
| DE | 19710714 | 9/1998 |

(Continued)

*Primary Examiner* — Arnel C Lavarias
(74) *Attorney, Agent, or Firm* — Myers Bigel, P.A.

(57) ABSTRACT

The invention is based on the object of providing a particularly reliable closed-loop control for a scanner. According to various examples, this object is achieved by an analysis of a system deviation in the frequency space. By way of example, an input signal, which is indicative of a time dependence of the system deviation between an ACTUAL pose and a TARGET pose of a deflection unit of the scanner, can be expanded into a multiplicity of error components and a plurality of frequencies. Then, a corresponding correction signal component can be determined for each of the multiplicity of error components. By way of example, such techniques can be used in a laser scanning microscope.

17 Claims, 6 Drawing Sheets

(56) References Cited

U.S. PATENT DOCUMENTS

2009/0153933 A1* 6/2009 Tsuchiya ............ G02B 26/0833
359/204.1
2009/0323163 A1* 12/2009 Steinkraus, Jr. ...... G05B 13/024
359/276

FOREIGN PATENT DOCUMENTS

| DE | 102005047200 | 4/2007 |
|----|--------------|--------|
| DE | 102005047218 | 4/2007 |

* cited by examiner

CLOSED-LOOP CONTROL OF A SCANNER WITH FREQUENCY-SPACE ANALYSIS OF A SYSTEM DEVIATION

CROSS REFERENCE TO RELATED APPLICATION

This U.S. non-provisional patent application claims priority under 35 U.S.C. § 119 to German Patent Application No. 102018109055.2, filed on Apr. 17, 2018, the disclosure of which is incorporated herein in its entirety by reference.

TECHNICAL FIELD

Various embodiments of the invention relate to techniques for closed-loop control of a scanner. In particular, various embodiments of the invention relate to techniques for taking account of error components in an input signal, which is indicative for a system deviation, in the control in the case of closed-loop control.

BACKGROUND

Scanners for deflecting light are employed in different fields of technology. By way of example, scanners are used for scanning in laser scanning microscopes (LSMs).

Scanners typically comprise a scanning module with a deflection unit, which is configured to deflect light. The light is deflected differently depending on the position and/or orientation of the deflection unit. This defines a scanning angle. As a result, light can be emitted in different directions. It may also be possible to receive light from different directions.

For the purposes of probing the sample, the scanners typically travel over defined curves, which are sometimes also referred to as scanning angle curves. Deviations from these target curves cause image distortions or double contours in LSMs, for example. Therefore, it is desirable to travel the scanning angle curves with a high spatial and temporal accuracy.

One technique for setting the scanning angle with a high accuracy employs a control loop. Here, a TARGET pose of the deflection unit can be predetermined and a deviation of a measured ACTUAL pose of the deflection unit from the TARGET pose can be minimized. A corresponding exemplary technique is described in, for instance, DE 10 2005 047 200 A1.

SUMMARY

There is a need for improved techniques for a closed-loop control of a scanner. In particular, there is a need for techniques which control the scanner both reliably and with a high accuracy.

This object is achieved by the features of the independent patent claims. The features of the dependent patent claims define embodiments.

A method for closed-loop control of a scanner comprises the reception of an input signal. The input signal is indicative for a time dependence of a system deviation between an ACTUAL pose and a TARGET pose of a deflection unit of the scanner. The method also comprises the expansion of the input signal into a multiplicity of error components at a plurality of frequencies. Further, the method comprises, for each of the multiplicity of error components, the determination of a corresponding correction signal component on the basis of a respective frequency response component of a predetermined reciprocal frequency response. Further, the method comprises the output of a control signal on the basis of a combination of the correction signal components.

Thus, it is possible for a receiver of an input signal to be present, with the input signal supplying the ACTUAL pose of the scanner. Then, the system deviation can be determined with the inclusion of the TARGET pose of the deflection unit, which is supplied to a regulator. The system deviation can be expanded into a multiplicity of error components at different frequencies. A corresponding correction signal component can be determined for each of the multiplicity of error components on the basis of the error component and the reciprocal frequency response of the system at the frequency of the respective correction signal component. Further, it may be possible to output a control signal on the basis of a combination of the correction signal components.

By way of example, it would be possible for the aforementioned steps—reception, expansion, determination and output—to be respectively repeated for a plurality of regulating processes, for example according to a controller clock cycle.

Thus, the error components can describe the system deviation in the frequency space.

Taking account of the various components may correspond to an analysis of the system deviation in the frequency space.

A control loop, in particular, can be implemented by receiving the input signal and outputting the control signal.

A particularly reliable and robust closed-loop control of the scanner can be obtained by implementing a control loop with an analysis of the system deviation in the frequency space. In particular, it is possible to correct errors that no longer can be corrected by conventional (PID) controllers. By way of example, scanning angle curves can be implemented particularly accurately.

By way of example, a corresponding method could be implemented by a controller for a scanner, wherein the controller may have a memory and a logic component, for example.

The controller can be part of an LSM, for example.

A computer program product or a computer program comprises program code, which can be loaded by a logic component. Then, the logic component can execute the program code. Executing the program code causes the logic component to carry out a method for closed-loop control of a scanner. The method comprises a reception of an input signal. The input signal is indicative for a time dependence of a system deviation between an ACTUAL pose and a TARGET pose of a deflection unit of the scanner. The method also comprises the expansion of the input signal into a multiplicity of error components at a plurality of frequencies. Further, the method comprises, for each of the multiplicity of error components, the determination of a corresponding correction signal component on the basis of a respective frequency response component of a predetermined reciprocal frequency response. Further, the method comprises the output of a control signal on the basis of a combination of the correction signal components.

The features set out above and features that are described below may be used not only in the corresponding combinations explicitly set out, but also in further combinations or in isolation, without departing from the scope of protection of the present invention.

DETAILED DESCRIPTION

The properties, features and advantages of this invention described above and the way in which they are achieved will become clearer and more clearly comprehensible in association with the following description of the exemplary embodiments which are explained in greater detail in association with the drawings.

The present invention is explained in greater detail below on the basis of preferred embodiments with reference to the drawings. In the figures, identical reference signs designate identical or similar elements. The figures are schematic representations of different embodiments of the invention. Elements illustrated in the figures are not necessarily depicted as true to scale. Rather, the different elements illustrated in the figures are reproduced in such a way that their function and general purpose become comprehensible to the person skilled in the art. Connections and couplings between functional units and elements as illustrated in the figures may also be implemented as an indirect connection or coupling. A connection or coupling can be implemented in wired (electric or optical) or wireless (electromagnetic, magnetic, optical, mechanical) fashion. Functional units can be implemented as securely wired hardware, hardware that is configurable and controllable by means of software or a combination of both.

Techniques for scanning light are described below. A corresponding scanner comprises a scanning module with a deflection unit. The scanning module may also comprise a mounting for the deflection unit, and an actuator. The actuator can be configured to exert a force on the mounting of the deflection unit and thus move the deflection unit. In the process, the pose of the deflection unit can be varied, as a result of which the scanning angle is varied.

As a general rule, different types of scanner can be used in the various examples described herein. Examples comprise: resonant scanners with free or forced resonance; non-resonant scanners, galvano scanners, MEMS scanners, incrementally moved scanners, continuously moved scanners, rotating scanners with ball bearings, etc. The mechanism with which the deflection unit is moved can vary depending on the employed type of scanner. In particular, a degree of freedom of the movement of the deflection unit can also vary. By way of example, the deflection unit could rotate in some examples, tilt in further examples, be deflected in transverse fashion in further examples, etc. Overlaid movements are also possible. Therefore, reference is made in general below to a variation of the position and/or the orientation (pose) of the deflection unit which, in principle, can describe all such degrees of freedom of the movement, either on their own or in combination with one another. The pose can be defined in a reference coordinate system which also determines the pose of the optical unit, i.e., a pose of a light source and/or a detector, for example.

In particular, scanners that implement periodic or quasi-periodic movement of the deflection unit can be used in the various examples described herein.

The techniques for scanning of light described herein can be used in different fields of technology. By way of example, corresponding scanners can be used in conjunction with an LSM. In the process, a sample object is sensed or scanned by a laser beam focused in punctiform fashion. Light that is scattered or reflected or re-emitted at the sample object is imaged on a pinhole. The light passing through the pinhole is captured by a detector, optionally after spectral splitting on the detector. In order to capture an image of a layer of the sample object, the laser beam is guided approximately line-by-line over the sample object by varying the scanning angle. Other examples comprise, e.g., laser micro-machining or printers or projectors, etc.

There is a closed-loop control of the scanner in the examples described herein. By way of example, a control loop can be implemented by a controller (closed-loop control). Then, the scanning angle can be set particularly accurately. A system deviation between a TARGET pose of the deflection unit and an ACTUAL pose of the deflection unit can be reduced efficiently and quickly and accurately, even in cases where other regulators no longer permit stable regulation.

This is based on the discovery that a conventional PID control loop is interested in the response characteristic of the system over broad frequency ranges, even if the actuation signal itself does not have any components there. This is different in the various examples described herein. If set correctly, the control loop only regulates where signal components are present. Furthermore, the feedback for each of these components can be set directly and independently of the other components.

The techniques described herein can be scaled flexibly. By way of example, it is possible to control a multiplicity of scanners in different channels. By way of example, a multiplicity of actuators can also be controlled per scanner. This be helpful for 2D scanning, for example, where light sequentially passes through a plurality of deflection units, which are actuated separately.

Various examples of the invention are based on an analysis of a system deviation between an ACTUAL pose of the deflection unit and a TARGET pose of the deflection unit. Here, the system deviation in real space is analysed as a component in frequency space. By way of example, the system deviation can be analysed at a plurality of discrete frequencies.

In order to carry out such an analysis of the system deviation in the frequency space, it may be desirable to receive a time-resolved input signal over a certain time interval; here, the input signal may comprise a plurality of data points, with each data point being indicative for the system deviation at a corresponding time.

By considering the system deviation over an integer multiple of its periodicity, it is possible to reliably detect system deviations of integer harmonics of its periodicity.

Figure 1:
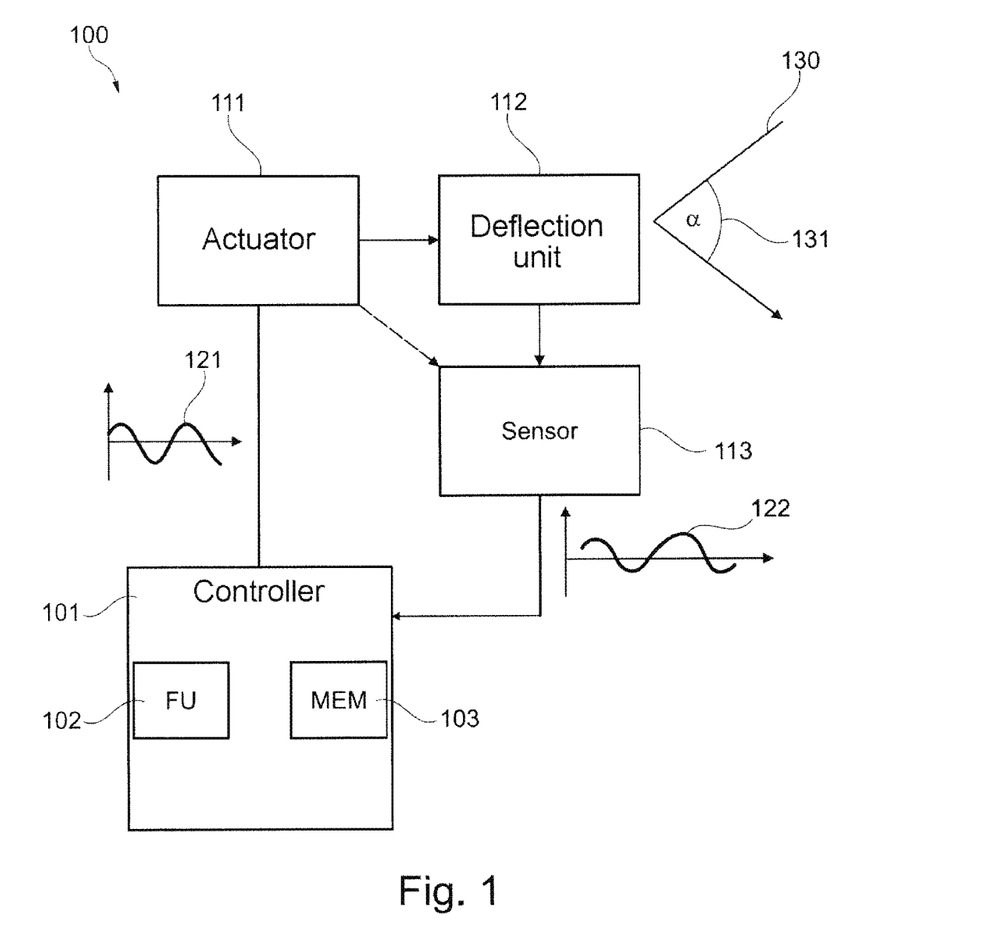
FIG. 1 schematically illustrates a scanner comprising a controller in accordance with various examples.

FIG. 1 illustrates aspects in relation to the scanner 100. By way of example, the scanner 100 could be part of an LSM, which furthermore comprises a light source, an objective lens, a sample stage, etc. (not illustrated in FIG. 1).

The scanner 100 comprises a deflection unit 112, which may be implemented by a mirror or a prism, for example. Incident light 130 is deflected through a scanning angle 131. The scanning angle 131 can be varied by varying the pose of the deflection unit 112.

The light 130 can originate both from a light source (for instance, a laser or an LED) and from a scattering or fluorescent test object or from a sample.

The scanner 100 also comprises an actuator 111. The actuator 111 is configured to modify the pose of the deflection unit 112, as a result of which the scanning angle 131 is also varied. Very different types of actuators 111 can be used in the various examples described herein, for instance piezo-actuators, capacitive actuators or magnetic actuators.

FIG. 1 also illustrates a control signal 121, which is output to the actuator 111 by a controller 101. The control signal 121 should bring about a periodic movement of the deflection unit 112 in accordance with a TARGET pose of the deflection unit 112.

Nevertheless, deviations may arise between the desired TARGET pose of the deflection unit 112 and the real ACTUAL pose of the deflection unit 112 on account of disturbing influences—for instance, heating, humidity, an external shock, ageing, material fatigue, partly unknown disturbing influences, etc. A sensor 113 is provided to capture such deviations. The sensor 113 is configured to output a measurement signal 122, which is indicative for the measured pose of the deflection unit 112. Hence, the measurement signal 122 is also indicative for the system deviation.

Here, FIG. 1 shows an example in which the sensor 113 determines the pose by measuring a physical observable in conjunction with the deflection unit 112. In other examples, it would also be possible, as an alternative or in addition thereto, to measure a physical observable in conjunction with the actuator 111 (dashed arrow in FIG. 1).

The controller 101 receives the measurement signal 122 and processes the latter. In particular, the controller 101 can implement a control loop on the basis of the measurement signal 122.

To this end, the controller 101 can be implemented by securely wired hardware, hardware that is configurable and controllable by means of software or a combination of both.

By way of example, the controller 101 could be implemented in time-discrete fashion with a digital circuit. By way of example, the controller 101 could be implemented as a field programmable gate array (FPGA), application-specific integrated circuit (ASIC) or microcontroller. FIG. 1 illustrates a corresponding logic component 102, which is sometimes also referred to as a functional unit (FU), and a memory 103. By way of example, the logic component 102 could load program code from the memory 103 and could then implement the control loop.

Figure 2:
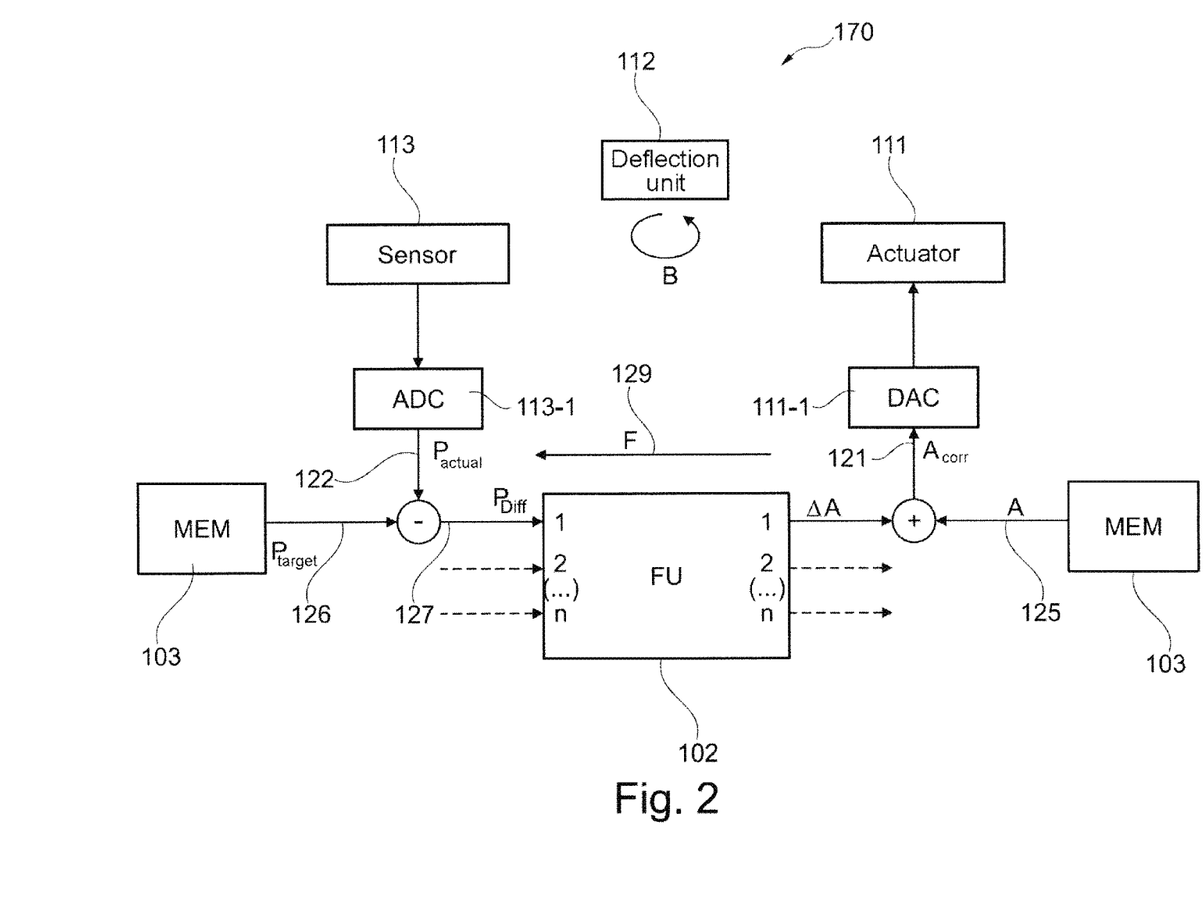
FIG. 2 is a schematic illustration in relation to a control loop, which is implemented by the controller in accordance with various examples.

The functionality of the logic component 102 is also described in conjunction with FIG. 2.

FIG. 2 illustrates aspects in relation to the closed-loop control of a scanner. In particular, FIG. 2 illustrates aspects in conjunction with a control loop 170.

The logic component 102 (regulator of the control loop) is functionally arranged between TARGET pose signal 126, $P_{target}$ (reference variable of the control loop), ACTUAL pose signal or measurement signal 122, $F_{actual}$ (feedback of the control loop) and an actuation signal 125, A that is optional as a matter of principle. The ACTUAL pose signal 122 is obtained from an analogue-to-digital converter 113-1, which is coupled to the sensor 113.

As a general rule, different types of sensors 113 (measuring member of the control loop) are conceivable, for instance: magnetic field sensors; optical sensors; capacitive sensors; etc. The type of sensor 113 can vary with the actuated degree of freedom of the movement of the deflection unit 112.

The difference between the TARGET and ACTUAL pose signal $P_{target} - P_{actual}$ (system deviation)—indicated by the input signal 127—is used to modify the predetermined actuation signal 125, A to form a corrected actuation signal 121, $A_{corr}$ (manipulated variable of the controller). The control signal 121 is transferred to the actuator 111 (actuating element of the control loop) via a digital-to-analogue converter 111-1.

The actuation signal 121, $A_{corr}$ produces a movement B of the deflection unit 112 and feeds back—by means of the sensor 113—a measurement signal 122, $P_{actual}$ that has a fixed relationship with this movement B (controlled variable of the control loop). In general, it is possible to measure the pose of the deflection unit 112 which is determined by the movement B.

It is possible to correct changes in the properties of the actuator 111, i.e., the influence of the actuation signal 121, $A_{corr}$ on B, if the properties of the sensor 113, i.e., the influence of B on the measurement signal 122, $P_{actual}$, are known.

The logic component 102 can resort to the frequency response 129, F, which mediates between the control signal 121, $A_{corr}$ output at the actuator 111 and the measurement signal 122, $P_{actual}$. By way of example, the frequency response 129, F and/or the reciprocal of the frequency response 129, F could be stored in the memory 103. The frequency response 129, F can correspond to a transfer function.

The logic component 102 is configured to correct periodic or almost periodic movements with a period T if the TARGET pose signal 126 is known as well as the frequency response 129, F. An optional (default) actuation signal 125, A is helpful. By way of example, the actuation signal 125, A can map certain technical boundary conditions of the actuator 111, for instance a certain minimum voltage in the case of piezo-actuators, etc.

The actuating signal 125, A is modified to form the corrected actuation signal 121, $A_{corr}$ such that the ACTUAL pose signal 122, $P_{actual}$ approaches the predetermined TARGET pose signal 126, $P_{target}$. Thus, the system deviation of the control loop is minimized.

To this end, the difference of TARGET and ACTUAL pose signal 122, 126 is combined by calculation over a preferably integer number of oscillation periods in various examples described herein.

The difference is correlated with an orthogonal basis over the period T (e.g., $\cos 2\pi m\, t/T$ and $\sin 2\pi m\, t/T$) over an integer number of oscillation periods, where m is an integer, non-negative number such as, e.g., m=1 and m=2 and specifies the correlated harmonic. These correlated entities are combined by calculation using the complex-value frequency response F at points that correspond to the harmonic frequencies of the period T (i.e., m/T). The coefficients thus calculated describe the amplitude of a harmonic correction of the observed errors. The—optionally weighted—sum of all harmonic corrections yields $\Delta A$; $A_{CORR} = A + \Delta A$ is used as a corrected actuation signal.

In general, other orthogonal basis functions instead of cosine and sine can also be taken into account for the expansion.

FIG. 2 illustrates that the logic unit 102 can process a plurality of channels 1, 2, . . . n. As a result, the correction of a plurality of movements and a plurality of actuators is possible.

Thus, e.g., periodic control signals 121 are generated, which are output to the actuator. By way of example, this can be implemented—as illustrated in FIG. 2—by producing a correction signal 121 on the basis of a predetermined basis signal 125.

Here, the logic component can trigger correction commands at defined times, in respect of which an update of the control signal 121 is implemented (regulating process). This can be implemented periodically or in event-related fashion. The logic component 102 could trigger a regulating process independently or in event-related fashion by producing the corresponding command. By way of example, a time interval between regulating processes can correspond to the controller clock cycle. In general, the controller clock cycle can vary over time. This means that the regulating processes can be carried out in not strictly periodic fashion or with a varying periodicity.

In general, there can be a parametrized analysis of the system deviation. Here, certain properties of the closed-loop control can be modified. By way of example, the parametrization can be undertaken by a register interface, the controller 101 or, in particular, the FU 102. As a result of the parametrizable analysis, it is possible, for instance, to flexibly choose the number of data channels to be analysed and data points of the measurement signal 122, with the data channels corresponding to the input and the output channels.

An exemplary implementation of the control loop 170 is described below.

The control loop 170 is subdivided into the modules (I) analysis,
(II) coefficient calculation and (III) synthesis, which produces the corrected actuation signal 121.

All calculations below can be carried out multiple times and independently for different channels, which are indexed below by 1 . . . n. However, the index n is not listed explicitly everywhere below for reasons of clarity.

(I) Analysis Module (ana):

The difference of ACTUAL pose signal 122 (also referred to as measurement signal) and TARGET pose signal 126 is determined for each data point:

$$P_{DIFF} := P_{ACTUAL} - P_{TARGET} \quad (1)$$

This corresponds to the input signal 127, $P_{DIFF}$. Forming the difference of Equation (1) is carried out iteratively for a plurality of data points, as a result of which each data point of the input signal 127, $P_{DIFF}$ is indicative for the system deviation at a corresponding time.

The data points for the ACTUAL pose signal 122 are received with a sampling clock cycle. By way of example, the sampling clock cycle can be predetermined by the sensor 113 and/or the ADC 113-1. Typically, the sampling clock cycle is substantially greater than the period duration T of the movement of the deflection unit 112, e.g., by a factor of 100 or 500 or 1000. Moreover, the sampling clock cycle is typically substantially greater than the controller clock cycle, for example by a factor in the range of between 200 and 10000, with this factor however also being able to reach orders of magnitude of 10^7 . . . 10^9, for example if scanners that move particularly slowly are regulated.

In each computer clock cycle, the data points of the input signal 127, $P_{DIFF}$ are multiplied by a sine and cosine of a predetermined frequency—for example, harmonics/harmonic oscillation 1 . . . m, respectively for each channel— and are summed for each computer clock cycle in an accumulating variable $\Delta C_m$, $\Delta S_m$:

$$\Delta C_m := \Delta C_m + P_{DIFF} \cos N_m \varphi \quad (2a)$$

$$\Delta S_m := \Delta S_m + P_{DIFF} \sin N_m \varphi \quad (2b)$$

m indicates the various frequencies. This processing is operated with the computer clock cycle of the FU 102 in order to process a plurality of data points between two regulating processes. That is to say Equations (2a) and (2b) are carried out repeatedly with the computer clock cycle. As a result, different frequencies can be taken into account sequentially for each data point by varying m. Optionally, it is also possible to take account of the plurality of channels.

Equations (2a) and (2b) correspond to an incremental expansion because the subsequent iteration builds on the result of the preceding iteration. The computer clock cycle—with which such calculations as are described in Equations (2a) and (2b) are carried out—is typically substantially greater than the controller clock cycle, e.g., by a factor of 10 or 100. A factor of, e.g., 20 (such as, e.g., presently in the case of the controller clock cycle=5 MHz, computer clock cycle=100 MHz) allows processing of, e.g., 20 harmonics of one axis or respectively 10 harmonics of two axes per execution unit; this will still be explained in more detail below.

Equations (2a) and (2b) correspond to expanding the input signal 127 in a multiplicity of error components at the plurality frequencies 1 . . . m. By virtue of selecting the computer clock cycle to be sufficiently high, Equations (2a) and (2b) can be calculated for a data point for all frequencies 1 . . . m before the next data point is obtained according to the sampling clock cycle. That is to say, the expansion of the input signal 127 can be implemented in real time.

Here, Equations (2a) and (2b) describe the decomposition of the input signal 127 in cosine and sine described as a basis in exemplary fashion. In general, other orthogonal basis functions instead of cosine and sine can also be taken into account for the expansion.

Equations (2a) and (2b) implement this expansion in the error components by multiplying each data point of the input signal 127, $P_{DIFF}$ by a first reference data point cos $N_m \varphi$ and a second reference data point sin $N_m \varphi$. Here, the first reference data point corresponds to the value of a first basis function of the corresponding frequency and phase—cosine in the example—and the second reference data point corresponds to the value of a second basis function of the corresponding frequency and phase—sine in the example. In general, other orthogonal, periodic functions can also be used instead of cosine and sine. The corresponding result values are then added to the values of the variables $\Delta C_m$ and $\Delta S_m$. These values are calculated sequentially for each data point, e.g., adapted iteratively.

By way of example, it would be possible for the corresponding data point $P_{DIFF}$ to be discarded following the addition of Equations (2a) and (2b). In this way, it is not necessary to keep a particularly large memory for all data points that are received between two correction commands. In general, the data point can be discarded after multiplying the corresponding data point $P_{DIFF}$ by the first reference data point and after multiplying the corresponding data point $P_{DIFF}$ by the second reference data point, but before the end of the corresponding controller clock cycle—i.e., before the next regulating process.

The variables $\Delta C_m$ and $\Delta S_m$ are reset when a regulating process is implemented i.e., for example, if a correction commando (apply_accu_derivation) is received, and so subsequent data points are summed anew.

$$\Delta C_m := 0 \quad (3a)$$

$$\Delta S_m := 0 \quad (3b)$$

In conclusion, the analysis module thus facilitates the expansion of the input signal in a multiplicity of error components at the various frequencies. Thus, this means that the system deviation can be quantified in frequency-resolved fashion. The coefficient calculation module can be carried out after the analysis module.

(II) Coefficient Calculation Module (calc_coe)

The coefficient calculation module can render possible the facilitation of the adaptation of the control signal for reducing the system deviation at the various frequencies. To this end, the frequency response 129, F is taken into account. The adaptation of the control signal is described by coefficients (see FIG. 2, $\Delta A$). These correspond to a corresponding correction signal component of the correction signal 121.

In particular, this includes the inverse/reciprocal frequency response of the system. The frequency response is typically complex valued, i.e., it describes the relationship between control signal 121 and a measurement signal 122 in relation to the amplitude ratio and phase difference as a function of the considered frequency. The frequency response used here describes the relationship between electric response of the position detector as a function of the frequency of the actuation signal. Thus, in the example, the frequency response is given by:

$$F: A_{corr} \rightarrow P_{actual}.$$

The reciprocal frequency response is given by:

$$F^{-1}: P_{actual} \rightarrow A_{corr}.$$

The frequency response is a complex-valued function. From it, it is possible to determine, inter alia, the response of the system in the case of the harmonic m of the considered oscillation.

These are described below as $\text{Re}(F^{-1}_m)$ and $\text{Im}(F^{-1}_m)$. $\text{Re}(F^{-1}_m)$ and $\text{Im}(F^{-1}_m)$ describe the real and complex component of the frequency response of the m-th harmonic of the currently regulated periodic movement. By way of example, it is possible that $\text{Re}(F^{-1}_m)$, $\text{Im}(F^{-1}_m)$ are stored in the memory 103 for all currently required harmonics m.

The results are summed in a variable and made available to the subsequent module (synthesis).

By way of example, the coefficient calculation can be carried out when a corresponding command is received. In addition to calculating new coefficients, further actions can be triggered by the command.

The APPLY_ACCUMULATED_DERIVATION command applies these two registers for all harmonics $N_m$:

$$C_m := C_m + \text{Re}(F^{-1}_m)\Delta C_m/p - \text{Im}(F^{-1}_m)\Delta S_m/p \quad (4a)$$

$$S_m := S_m + \text{Re}(F^{-1}_m)\Delta S_m/p + \text{Im}(F^{-1}_m)\Delta C_m/p \quad (4b)$$

This corresponds to determining components of the correction signal for the different error components. Here, p is the number of summed data points in the summation of $\Delta S_m$ and $\Delta C_m$.

Using modified sine and cosine functions (period length $2^{32}$ or $2^{64}$ instead of $2\pi$), (4a) or (4b) can also be carried out as integer arithmetic.

The RESET_ONLINE_CORRECTION command resets the registers:

$$C_m := 0 \quad (5a)$$

$$S_m := 0 \quad (5b)$$

In conclusion, the coefficient calculation module thus facilitates the determination of correction signal components as coefficients for the correction signal 121 at the various frequencies. Then, the correction signal can be produced—proceeding from these correction signal components—in the following synthesis module.

(III) Synthesis Module (syn)

The corrected actuation signal 121 is generated in the synthesis module and emerges from the combination, e.g., the weighted or unweighted sum, of all correction signal components. Here, the current coefficients from the coefficient calculation module (calc_coe) are loaded again for each regulating process and said current coefficients are multiplied by sine and cosine in order to facilitate the transformation into the time-space.

$$\Delta A_m = C_m \cos N_m \varphi + S_m \sin N_m \varphi, \quad (6)$$

where $\cos N_m \varphi$ and $\sin N_m \varphi$ were already calculated in (2a) and (2b).

Equation (6) once again corresponds to the calculation of the plurality of data points of the correction signal.

The various frequency contributions are added.

$$\Delta A = \Delta A_1 + \Delta A_2 + \ldots + \Delta A_m \quad (7)$$

and the control signal 121, $A_{CORR}$ is calculated on the basis of the correction contribution from Equation (7) and the predetermined default control signal 125:

$$A_{CORR} = A + \Delta A. \quad (8)$$

In a further variant, the result can also be written in a plurality of accumulating output variables in order to facilitate a mixture or duplication of results. To this end, use can be made of one hot coding, for example.

(IV) Generalities:

In (2a) and (2b), and also (6), $\varphi$ denotes the current phase. Proceeding from the last correction command RESET_ONLINE_CORRECTION, RESET_ACCUMULATED_DERIVATION or APPLY_ACCUMULATED_DERIVATION, the data points are counted (value p; see also Equations (4a) and (4b)) and the current phase $\varphi$ is determined as:

$$\varphi := 2\pi p/k \quad (9a)$$

which can also be calculated as $$\varphi := 2\pi (p \text{ MOD } k)/k \quad (9b)$$

How the aforementioned techniques can be implemented in the FU 102 using few resources will be described below If the computer clock cycle—with which the various calculations according to the aforementioned equations can be carried out by the FU 102—is substantially higher than the sampling clock cycle, with which the data points of the input signal 127, $P_{Diff}$ are obtained, the computational resources of the FU 102 can be employed multiple times in sequence in each sampling clock cycle. Here, different options are conceivable for designing the resources management of the computational resources of the FU 102. Time slices are used in one example: Then, e.g., u harmonic time slices are assigned to each input channel n, said time slices dividing the resource allocation of the computational resources of the FU 102. These time slices are activated in sequence; the calculation for a time slice is carried out in full or in part with each computer clock cycle. Thus, a time slice can have a length of one or more computer clock cycles. The time slices can be considered to be place holders for computational slots which are divided among the number of channels |n| and the number of frequencies |m| of the respective channel.

The following boundary conditions emerge from the time slice processing: The computational operations (1)-(9b) assigned to the various time slices are processed in sequence. Further, the possible number of time slices present per data point is determined by the system and emerges, in particular, from the ratio of computer clock cycle to sampling clock cycle. Typically, the computer clock cycle is greater than the sampling clock cycle by at least a factor of 20. This ensures that the processing of an entire time slice clock cycle—i.e., of the analysis module—is completed before the next data point. The time slice clock cycle emerges from the temporal sequence of all time slices 1 . . . u, wherein the sequence thereof need not necessarily be increasing. By way of example, in order to ensure this, the number of error components |m| could be determined on the basis of the ratio of the computer clock cycle to the sampling clock cycle. Optionally, the number of channels could also be taken into account. This is described on the basis of a specific example: 13 usable time slices emerge per data point in the case of a sampling clock cycle of 5 MHz and a computer clock cycle of 66 MHz. Accordingly, the number of error components can be up to |m|=13 in the case of one channel, and, e.g., respectively |m|=6 per channel in the case of two channels.

Figure 3:
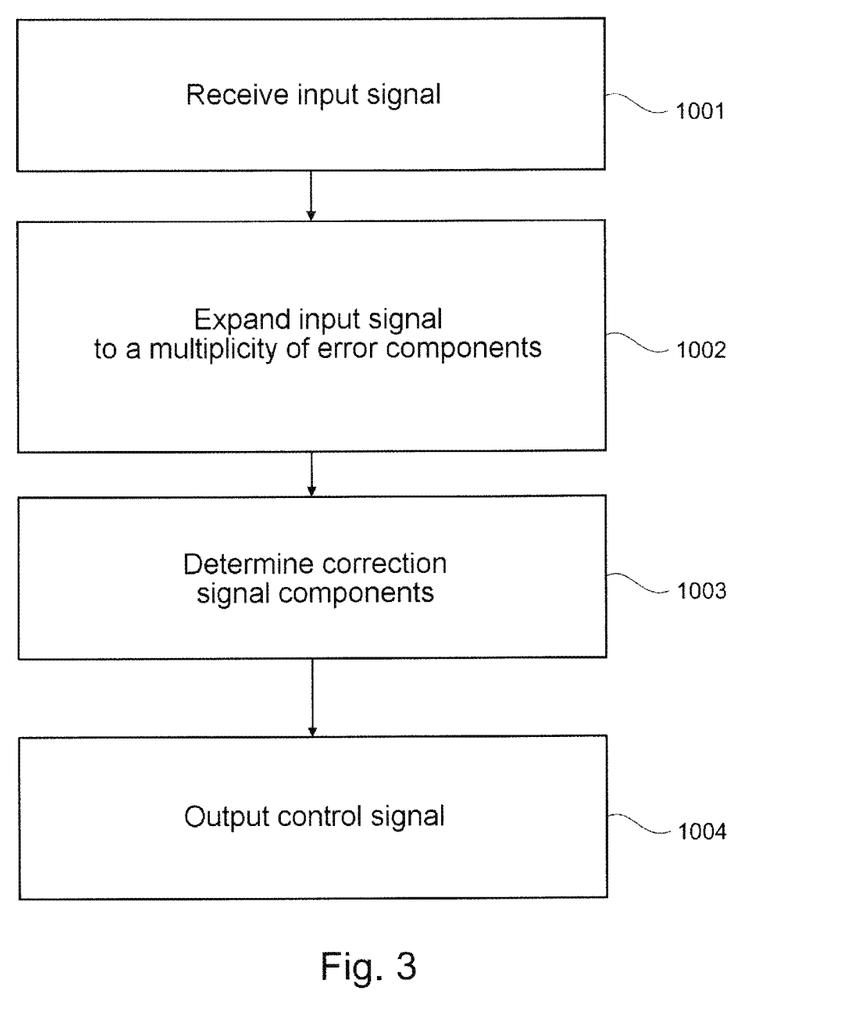
FIG. 3 is a flowchart of one exemplary method.

FIG. 3 is a flowchart of one exemplary method. By way of example, the flowchart can be carried out by the FU 102.

Initially, an input signal is received in block 1001. The input signal is indicative for a time dependence of a system deviation between an ACTUAL pose and a TARGET pose of a deflection unit of a scanner. By way of example, the input signal 127 of FIG. 2 could be received. This also corresponds to Equation (1).

Here, the input signal 127 may comprise a multiplicity of data points. By way of example, these data points are received sequentially with a sampling clock cycle signal. Different data points describe the ACTUAL pose at different times. The sampling rate can correspond to a time resolution of a corresponding sensor, for example. These days, typical sampling clock cycle signals lie in the range of 1 kHz and 10 MHz. What this can achieve is that the input signal indicates the system deviation in time-resolved fashion.

As a general rule, it is not necessary for the data points to be received according to an unchanging, strictly periodic sampling clock cycle between two regulating processes. Temporal fluctuations of the sampling clock cycle are also possible. Where necessary, these would have to be taken into account in the frequency space analysis of the input signal by way of taking into account the changeable time intervals between adjacent data points.

This is followed by an analysis of the input signal in the frequency space. To this end, the input signal is expanded into a multiplicity of error components in block 1002. Such an expansion of the input signal into respective error component comprises the decomposition of the input signal into orthogonal basis functions of the corresponding frequency. The different error components have different frequencies. By way of example, this corresponds to the calculation in Equations (2a) and (2b). Thus, in general, the expansion of the input signal for each data point can be implemented in sequence in relation to the multiplicity of error components, specifically, for example, in conjunction with Equations (2a) and (2b) by varying the index m. Different time slices can be used in the process. The calculation of the sum of Equation (2a) or the sum of Equation (2b) for a certain error component or frequency and for a certain channel can be assigned to different time slices in each case. The available computational resources can be managed by the time slices.

The expansion of the input signal can be implemented, in particular, sequentially for each data point of the multiplicity of data points, directly after the arrival thereof or, in general, in reaction to the reception of a data point with a computer clock cycle. By way of example, Equations (2a) and (2b), specifically, can be carried out for a newly obtained data point before a further data point is received with the sampling clock cycle. Consequently, it is not necessary to store the data points or build up the calculations. The input signal can be expanded in real time, in particular incrementally for each data point. As a result, the following can be achieved: (i) low storage requirements, independently of the number of data points of the input signal. (ii) continuous combining by calculation without load peaks (no build up). (iii) an instantaneous regulating process or a regulating process with only a few sampling cycles delay is possible, directly after completion of the analysis; there are very low time requirements, independently of the number of processed data points.

Subsequently, the corresponding correction signal component is determined in block 1003 for each error component. By way of example, this is based on a respective frequency-related frequency response component of a predetermined reciprocal frequency response. A corresponding implementation is illustrated, for example, in Equations (4a) and (4b).

Then, the various correction signal components can be combined in block 1003; see Equation (7), for example. Subsequently, an appropriate control signal can be output in block 1004; see Equation (8), for example.

Figure 4:
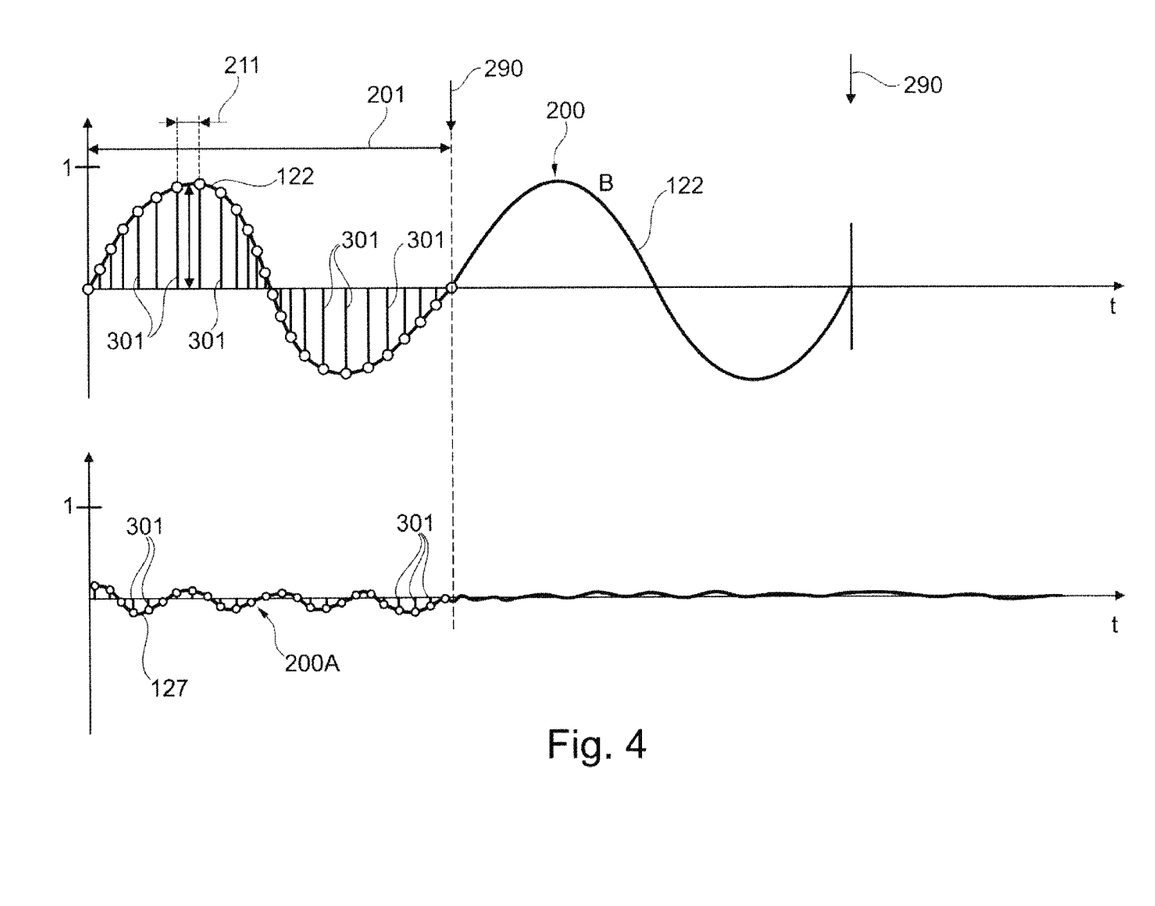
FIG. 4 illustrates the time curve of a movement of a deflection unit of the scanner and the sampling of the movement of the scanner and a system deviation in accordance with various examples.

FIG. 4 illustrates aspects in relation to a controller clock cycle 201. In particular, FIG. 4 illustrates the desired, periodic movement 200, B of the deflection unit 112. This periodic movement 200 is indicated by the measurement signal 122, which specifies the ACTUAL pose of the deflection unit 112.

It is evident from FIG. 4 that the controller clock cycle 201 corresponds to the clock cycle of the TARGET operating frequency of the movement 200 of the deflection unit 112. That is to say, the controller clock cycle 201 corresponds the period duration $T_P$ of the movement that should be regulated. To this end, the correction command 290—which triggers a regulating process, see, e.g., Equations (6)-(8)—can be output with the controller clock cycle 211 in each case.

As a general rule, the controller clock cycle can be chosen to be fixed and unchanging over time, or else it could be adapted over time. By way of example, a check as to whether the controller clock cycle 201 should be adapted can be carried out with the output of a correction command 290. Such an adaptation of the controller clock cycle over time renders it possible to resolve a trade-off between (i) image aberrations on account of regulation that is too slow and (ii) image aberrations on account of an erroneous, unnecessary or bothersome correction of the movement on account of uncertainties or signal noise in the measurement signal. Thus, for example, it may be expedient to regulate more quickly at the start of the movement or at the start of using the control loop in order to quickly compensate large deviations or fast drifts; with continuing movements, it may be expedient to subsequently lengthen the time intervals between the correction commands 290 in order, for example, to reduce the noise of the sensor and hence to reduce jitter as a result of this noise.

The subsequent table illustrates an example for adapting the controller clock cycle over time, specifically together with the correction command 290 in each case.

TABLE 1

Adapting the controller clock cycle 201 over time

| LSM image | Regulating interval, i.e., correction command 290 | Duration of the regulating interval, i.e., controller clock cycle 201 | Noise of the measurement signal 121 |
|---|---|---|---|
| Image 1 | 1 | from 0 * $T_P$ to 1 * $T_P$ | 100% |
|  | 2 | from 1 * $T_P$ to 3 * $T_P$ | 70% |
|  | 3 | from 3 * $T_P$ to 7 * $T_P$ | 50% |
|  | 4 | from 7 * $T_P$ to 15 * $T_P$ | 35% |
|  | 5 | from 15 * $T_P$ to 31 * $T_P$ | 25% |
|  | 6 | from 31 * $T_P$ to 63 * $T_P$ | 18% |
|  | 7 | from 63 * $T_P$ to 95 * $T_P$ | 18% |
|  | 8 | from 95 * $T_P$ to 127 * $T_P$ | 18% |
|  | ( ... ) |  |  |
|  | 12 | 223 * $T_P$ to 255 * $T_P$ |  |
| Image 2 | 1-8 | Respectively 32 $T_P$ |  |
| Image 3 | 1-8 | Respectively 32 $T_P$ |  |
| Image 4 | ( ... ) | ( ... ) |  |

FIG. 4 also illustrates aspects in relation to a sampling clock cycle 211. The sampling clock cycle 211 is substantially greater than the controller clock cycle 201. As a general rule, the sampling clock cycle 211 could be greater than the controller clock cycle 201 by at least a factor of 500. Data points 301 of the measurement signal 122—and hence also of the input signal 127—are received with the controller clock cycle 201 to ensure that; see Equation (1). Therefore, the sampling clock cycle 211 corresponds to a time resolution of the input signal 127.

FIG. 4 also illustrates the input signal 127. The input signal 127 is indicative for the system deviation 200A. It is evident from FIG. 4 that, typically, the system deviation 200A has a substantially smaller amplitude than the amplitude of the movement 200 itself. Typically, the regulating target is set in respect of minimizing the system deviation 200A.

Figure 5:
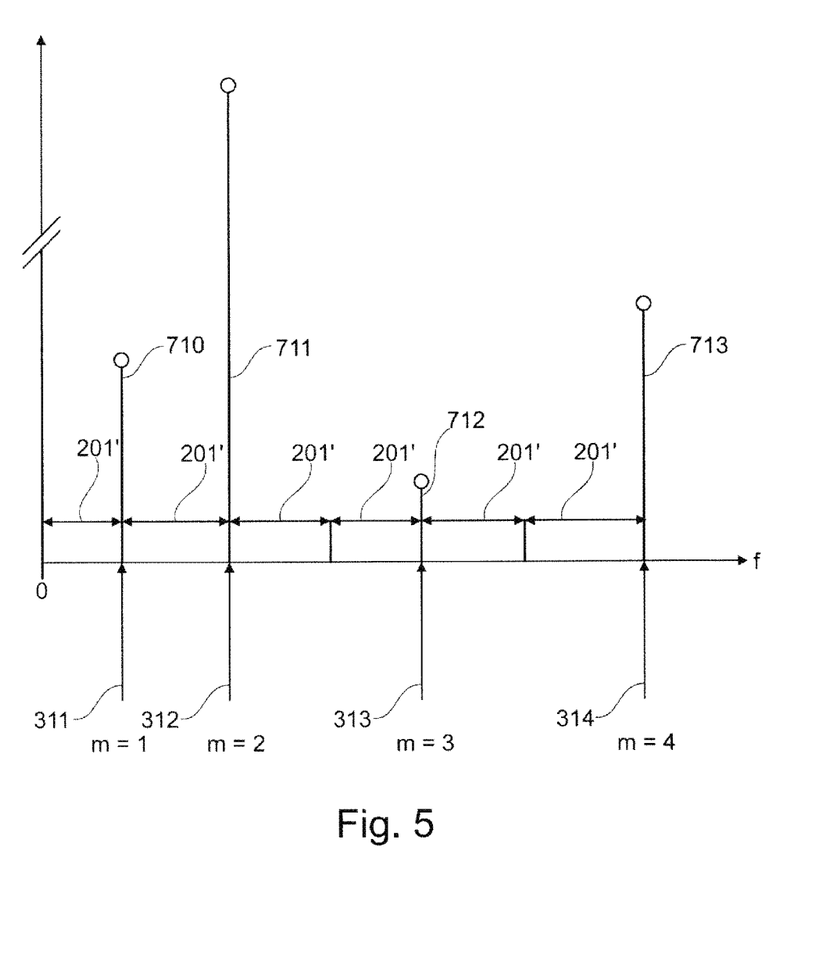
FIG. 5 schematically illustrates an analysis of the system deviation in the frequency space in accordance with various examples.

FIG. 5 illustrates aspects in relation to analysing the input signal 127 in frequency space. In particular, FIG. 5 illustrates aspects in relation to frequencies of an expansion of the input signal 127 or the decomposition of the input signal into components of different frequencies 311-314.

FIG. 5 illustrates that an expansion of the input signal 127 into error components is implemented for four frequencies 311-314. The frequency 311 (m=1) corresponds to the controller clock cycle 201 (illustrated in frequency space in FIG. 5 and therefore denoted there by 201'; illustrated in time-space in FIG. 4). The frequency 312 (m=2) in this case corresponds to twice the controller clock cycle 201, the frequency 313 (m=3) corresponds to four times the controller clock cycle 201 and the frequency 314 (m=4) corresponds to six times the controller clock cycle 201. This is one example. In other examples, it would be possible, for example, to regulate the controller clock cycle itself, three times the controller clock cycle, five times the controller clock cycle and seven times the controller clock cycle.

When matching the controller clock cycle 201 to the TARGET operating frequency of the movement 200 (cf. FIG. 4), this corresponds to a harmonic series of the TARGET operating frequency of the movement 200. As a general rule, the frequencies could thus be the multiple of the base frequency. The base frequency is the frequency f, and so the movement or the actuation signal repeats cyclically after the 1/f. Firstly, this achieves regulation of only components that are present in the system and that may occur. Secondly, these signals are orthogonal to one another.

The choice of the frequencies in FIG. 5 is exemplary and, in general, other, fewer or more frequencies may be selected.

FIG. 5 also illustrates the contribution of the various error components 710-713 to the input signal 127.

The greatest contribution is supplied—in the non-limiting example of FIG. 5—by the error component 711 at the TARGET operating frequency of the movement 200. The error components 711-713 supply smaller contributions. The amplitude of the error components 710-713 corresponds to sqrt($C_m^2 + S_m^2$) of Equations (6a) and (6b).

In general, the amplitude of the error components 710-713 can vary. Strong used signals need not necessarily produce the strongest corrections, even if these promote the latter. Higher frequencies of the error components tend to produce more regulation because a possibly also still present PID controller or PD controller corrects such high frequencies to substantially worse extent. Components in the region of the resonant frequency of the PID controller also tend to produce relatively large deviations since small changes in the parameters there significantly change the phase frequency response.

Figure 6:
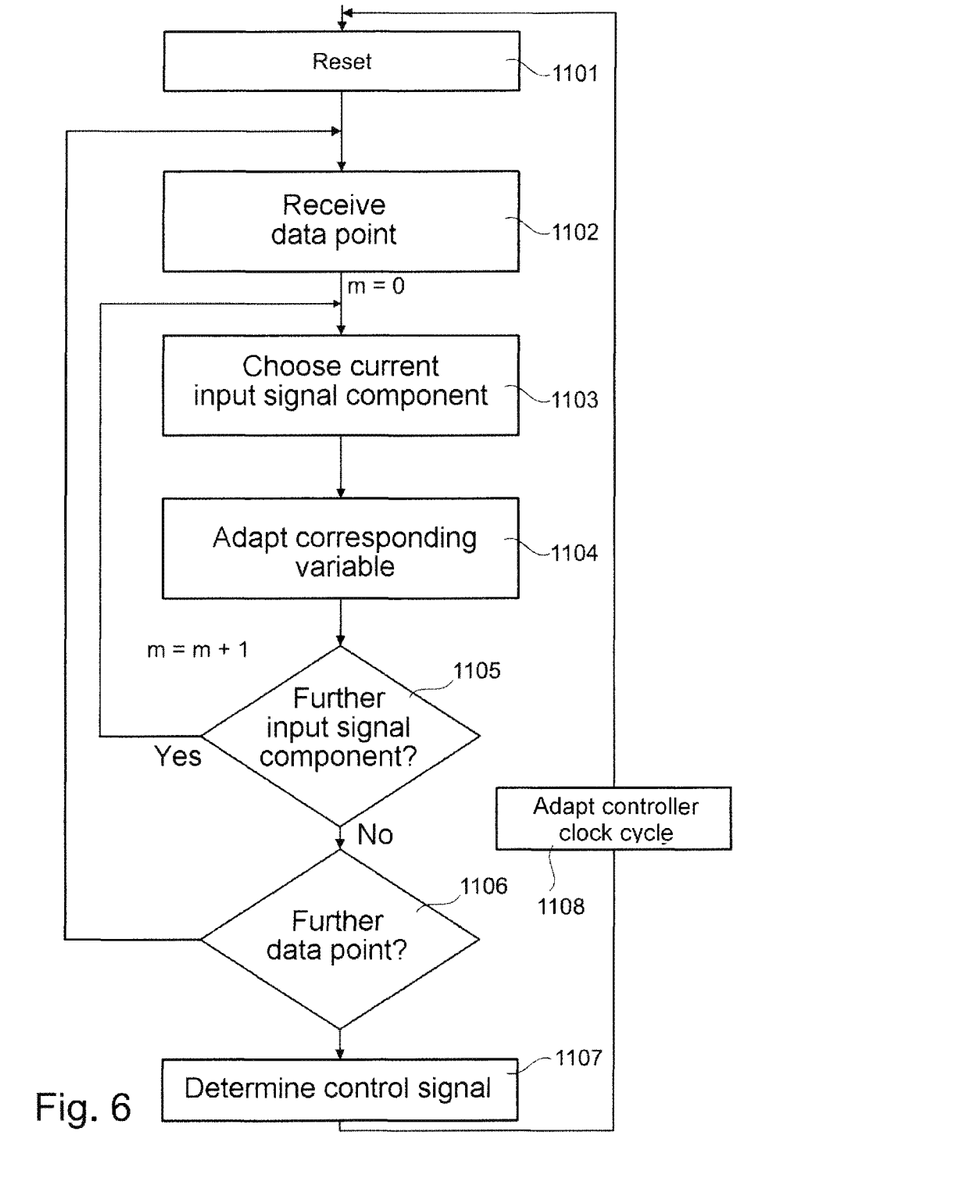
FIG. 6 is a flowchart of one exemplary method.

FIG. 6 is a flowchart of one exemplary method. The flowchart according to FIG. 6 corresponds to a correction clock cycle. By way of example, the correction clock cycle could start when the operation of a scanner is started. Hence, the control loop is initialized.

Initially, there is a reset in block 1101. This may correspond to setting the values of the variables according to Equations (3a), (3b), (5a) and (5b) to zero.

Then, a new data point 301 of the input signal 127 is received in block 1102. The data point 301 is indicative for the system deviation 200A at a certain time. By way of example, the data point 301 could be obtained by the calculation according to Equation (1) from the TARGET pose signal 126 and the measurement signal 122—which corresponds to the ACTUAL pose signal.

Then, a current error component is selected in block 1103 and the corresponding variable is adapted in conjunction with the expansion of the input signal into the corresponding error component in block 1104. This may correspond to a scalar product with two orthogonal basis functions of the corresponding frequency and can be implemented, for example, by Equations (2a) and (2b). Appropriate time slices can be used by taking account of the available computer clock cycle in order to carry out these calculation operations.

Blocks 1103 and 1104 may correspond to the analysis module, as described above.

Then, a check is carried out in block 1105 as to whether a calculation for further error component 710-713 should be carried out. If this is the case, blocks 1103 and 1104 are carried out again in further time slices.

Otherwise, a check is carried out in block 1106 as to whether a further data point 301 should be received before the end of the controller clock cycle or before emitting a correction command 290 for triggering a regulating process.

If the expansions are carried out in real time, it is possible to ensure that block 1106 is carried out before the next data point of the input signal 127 is received in the next iteration of block 1102. So that the expansion can be implemented in real time, the computer clock cycle—with which blocks 1103 and 1104 can be carried out in the different time slices—can be compared to the sampling clock cycle, which defines the time interval between the reception of sequential data points. Then, it would be possible, for example, to determine the number of error components, i.e., the number of iterations of blocks 1103 and 1104 per iteration of block 1102, from the ratio between computer clock cycle and sampling clock cycle.

If it is determined in block 1106 that no further data point should be received, the control signal 121 is determined in block 1107. By way of example, this may comprise carrying out the coefficient calculation and synthesis modules, i.e., carrying out Equations (4a), (4b), (5a), (5b) and (6)-(8). Block 1107 can be carried out particularly quickly—on account of the already previously implemented iterative adaptation of the variables; cf. Equations (2a) and (2b). The resource-intensive expansion was already undertaken previously, for example in real time.

The controller clock cycle is optionally adapted in block 1108; cf. Table 1. By way of example, it may be expedient to reduce the frequency of regulation, i.e., the controller clock cycle, when the regulation target is approached—i.e., for example, depending on the size of the system deviation and/or with increasing number of iterations of block 1108. This may serve to reduce the effects of errors of the sensor 113, in particular non-systematic errors, on the corrected scanner movement.

It goes without saying that the features of the embodiments and aspects of the invention described above can be combined with one another. In particular, the features can be used not only in the combinations described but also in other combinations or on their own without departing from the scope of the invention.

By way of example, examples described above are described in conjunction with LSMs. However, corresponding techniques can also be used for other applications.

What is claimed is:

1. A method for closed-loop control of a scanner, wherein the method comprises:
   receiving an input signal, which is indicative of a time dependence of a system deviation between an ACTUAL pose of a deflection unit of the scanner and a TARGET pose of the deflection unit of the scanner;
   expanding the input signal into a plurality of error components at a plurality of frequencies;
   for ones of the plurality of error components, determining corresponding correction signal components based on respective frequency response components of a predetermined reciprocal frequency response; and
   outputting a control signal based on a combination of ones of the correction signal components.

2. The method according to claim 1,
   wherein the input signal comprises a plurality of data points which are received with a sampling clock cycle, and
   wherein each of the plurality of data points is indicative of the system deviation at a corresponding time.

3. The method according to claim 2,
   wherein the expanding the input signal comprises expanding the input signal for each of the plurality of data points sequentially with respect to the plurality of error components.

4. The method according to claim 2,
   wherein the sampling clock cycle is greater than a controller clock cycle of the closed-loop control by at least a factor of 500.

5. The method according to claim 2,
   wherein the expanding the input signal comprises expanding the input signal for each of the plurality of data points incrementally with a computer clock cycle for each data point of the plurality of data points.

6. The method according to claim 5,
   wherein the computer clock cycle is greater than the sampling clock cycle by at least a factor of 20.

7. The method according to claim 5, wherein the method further comprises:
   determining a number of the plurality of error components based on a ratio of the computer clock cycle to the sampling clock cycle.

8. The method according to claim 2,
   wherein the expanding the input signal comprises expanding the input signal for each of the plurality of data points incrementally in real time for each data point of the plurality of data points.

9. The method according to claim 2, wherein the expanding the input signal for each data point of the plurality of data points and for each error component comprises:
   multiplying a corresponding data point of the plurality of data points by a first reference data point which corresponds to a value of a first basis function with a corresponding frequency and phase to obtain a first result value;
   multiplying the corresponding data point by a second reference data point which corresponds to a value of a second basis function that is orthogonal to the first basis function, with the corresponding frequency and phase to obtain a second result value;
   adding the first result value with a value of a first variable; and
   adding the second result value with a value of a second variable,
   wherein the value of the first variable and the value of the second variable are sequentially determined for each data point of the plurality of data points.

10. The method according to claim 9, wherein the expanding the input signal for each data point of the plurality of data points and for each error component comprises:
    discarding the corresponding data point after multiplication of the corresponding data point with the first reference data point and after multiplication of the corresponding data point with the second reference data point and before an end of a controller clock cycle of the closed-loop control.

11. The method according to claim 1,
    wherein the expanding the input signal into a respective error component comprises a decomposition of the input signal into orthogonal basis functions of the corresponding frequency.

12. The method according to claim 1,
    wherein the frequencies of the multiple plurality of error components correspond to a harmonic series of a TARGET operating frequency of a movement of the deflection unit.

13. The method according to claim 12,
    wherein a controller clock cycle of the closed-loop control corresponds to a clock cycle of the TARGET operating frequency.

14. The method according to claim 1, further comprising:
    adapting a controller clock cycle over time.

15. The method according to claim 14,
    wherein the controller clock cycle is adapted by gradual lowering of the controller clock cycle.

16. A controller for a scanner comprising a moving deflection unit,
    wherein the controller is configured to perform operations of the method according to claim 1.

17. A laser scanning microscope, comprising the controller according to claim 16.

* * * * *